Nov. 7, 1961 G. E. KELLY 3,007,999

PHASE SHIFTING CIRCUIT ARRANGEMENTS

Filed April 10, 1956 2 Sheets-Sheet 1

INVENTOR.
Gordon E. Kelly
BY
ATTORNEY

Nov. 7, 1961 G. E. KELLY 3,007,999

PHASE SHIFTING CIRCUIT ARRANGEMENTS

Filed April 10, 1956 2 Sheets-Sheet 2

INVENTOR.
Gordon E. Kelly
BY Olin D. Mitchell
ATTORNEY

United States Patent Office 3,007,999

Patented Nov. 7, 1961

3,007,999

PHASE SHIFTING CIRCUIT ARRANGEMENTS

Gordon Emmet Kelly, Haddonfield, N.J., assignor to Radio Corporation of America, a corporation of Delaware Filed Apr. 10, 1956, Ser. No. 577,348
8 Claims. (Cl. 178—5.4)

The invention relates to circuit arrangements for shifting the amplitude and phase relationships of a plurality of continuous waves. It particularly pertains to such circuit arrangements for producing a plurality of phase related color reference signals required for demodulating the chrominance signal in the full color reproduction of a televised image.

The composite color signal broadcast in accordance with U.S. standards, set forth in Federal Communications Commission public notice No. 53–1663, of December 17, 1953, comprises deflection synchronizing pulses, a luminance signal, a chrominance signal, and color bursts. The deflection synchronizing pulses are used to control the scanning of the electron beam forming the raster on the face of the kinescope in synchronism with the scanning of the electron beam in the color television camera. The luminance signal is intended to have exclusive control of the luminance of the reproduced image and corresponds to the present black-and-white, or monochrome, signal. The chrominance signal is constituted by the side bands of a phase- and amplitude-modulated subcarrier wave of frequency corresponding to one of the higher luminance video signal frequencies. The demodulated chrominance signal consists of color difference signals which when added to the luminance signal will be effective to reproduce the televised image in full color. The color difference signals are derived from the chrominance signal by synchronous detection, that is, by heterodyning or mixing the chrominance signal with a plurality of color reference signals of phase relationships in accordance with the color difference signals to be derived. The color bursts, which comprise a few cycles of sine wave of color subcarrier frequency, follow the horizontal deflection synchronizing pulses during the blanking interval and are employed for establishing the color reference signals in accurately maintained phase relationship for demodulating the chrominance signal. Without such color bursts, the chrominance subcarrier demodulation process will not take place in the proper phase relationship and the hue of the reproduced image will not correspond to that of the image transmitted. The color reference signals, which are generated in precise predetermined phase relationship to the color burst, must be maintained in accurate phase relationship with respect to the color bursts or the quality of the reproduced color image will be inferior.

There are known chrominance signal demodulating circuit arrangements utilizing color reference signals which are in cardinal angle phase relationship with respect to each other. Cardinal angles and cardinal phase relationship as the terms are used herein are construed to comprise those angles or phase relationships which are inherent in mutually coupled circuits tuned to maximum or minimum response at a given frequency. Examples of such phase relationships are found in circuits producing waves which are in phase, in phase quadrature, or out of phase with respect to each other. There are other chrominance signal demodulating circuit arrangements, however, having advantages over prior art arrangements, which require color reference signals related to the color burst by inter-cardinal angles, that is angles which are intermediate the cardinal angles of the order of 0, 90, 180, 270 degrees. The prior art arrangements for generating such inter-cardinal waves tend to generate undesirable harmonic components and exhibit unsymmetrical source impedance characteristics. These circuits also present additional problems in color television receiver design because variations in amplitudes of the color reference signals affects the background illumination of the reproduced image. Furthermore, it is difficult for the technician to determine the exact phase angle required unless he has access to and is familiar with complex circuit alignment equipment.

An object of the invention is to produce a plurality of harmonic free electric wave signals of inter-cardinal phase relationship.

Another object of the invention is to provide electric wave generating apparatus presenting symmetrical source impedance characteristic about the center frequency of the electric waves.

A further object of the invention is to provide an electric wave generating apparatus producing regulated inter-cardinal phase related waves of substantially equal amplitudes.

A feature of the invention is found in the ability to tune resonant circuits to maximum indication on a potential measuring instrument to obtain the desired inter-cardinal phase angle, thereby eliminating the requirement for complex circuit alignment equipment and procedures.

According to the invention color reference signal generating apparatus may comprise an output circuit, in the form of a transformer for example, having a plurality of mutually coupled windings tuned to produce output voltages of color reference signal frequency and differing in phase by a cardinal angle, for example 90°. A utilization device requiring a signal at an inter-cardinal phase angle with respect to a reference signal is coupled to one of the windings. A signal of reference phase is obtained from the other winding and applied to the utilization device by means of a resistance element. The resistance element is given a resistance at which the vector sum of the cardinal phase voltage and the reference phase voltage is a signal voltage having a desired amplitude and phase relationship with respect to the reference. For example a signal of 1.732 times the amplitude of the reference signal and in phase quadrature relationship therewith will produce a resultant signal of amplitude equal to twice the reference signal with a phase displacement of 60° with respect to the reference signal.

For a color television receiver of the type employing a pair of multi-grid electrode tubes in the chrominance signal demodulating circuit with the chrominance signal applied in the same phase to like electrodes of the tubes, the color reference signals applied to other like electrodes of the demodulator tubes may be obtained according to the invention from a color reference signal generating circuit having a single pair of output windings. Terminals of the output windings are connected in common with the common electrodes of the tubes and the remaining terminals of the windings are connected to the other like electrodes of the demodulating tubes. The pair of windings are tuned in accordance with known practice to provide output voltages in phase quadrature, or some odd multiple of 90°. A resistance element is then connected between the other terminals of the two windings, so that the two windings are effectively in series across the resistance element. The resistance element is adjusted to a resistance value at which the phase relationship between the voltages applied to the other like electrodes of the demodulator tubes differ by the required inter-cardinal angle, for example 64.2°.

For a color television receiver employing a chrominance signal demodulating circuit of the type comprising a plurality of pairs of electron discharge tubes having like electrodes excited in paraphase relationship and the color reference signals applied to each pair of demodulator tubes differing in phase by an intercardinal angle, the color reference generating circuit according to the invention may comprise an output circuit comprising one winding comprising two bifilar wound conductors and another winding. The bifilar winding is connected to provide paraphase output potentials with respect to a common connection of the three conductors constituting the bifilar and the other windings. The elements of the demodulating circuitry are connected to the other terminals of the bifilar wound conductors and the desired phase displacement obtained by a resistance element connecting one of the other terminals of a bifilar wound conductor and the other terminal of the other winding. In this manner the reference wave component is introduced into one conductor of the bifilar winding by the resistive connection and is induced into the other conductor of the bfilar winding by the inherent transformer action of the bifilar winding.

Further according to the invention, the color reference signals required for a chrominance signal demodulating circuit of the type wherein controlled ratios of amplitudes of color reference signal are required to avoid background illumination problems, the reference wave is applied by way of another resistance element through a circuit tuned to provide reference waves to other elements of the chrominance demodulating circuit. The other resistance element is given a value at which the reference wave component applied to the demodulating circuit is of the same amplitude as the resultant inter-cardinal color reference signal applied to the other elements. The bifilar winding may be used to apply paraphase related color reference signals to these other circuits if desired. Further in accordance with the invention, the isolation of elements of the chrominance signal demodulating circuit is maintained by arranging the circuit arrangement with the resistance elements connected in series between the elements of the chrominance signal demodulating circuit to be isolated.

In order that the invention may be fully appreciated and the advantages thereof readily obtained in practice, express embodiments of the invention are described hereinafter with reference to the accompanying drawing in which.

Figures 1, 4:
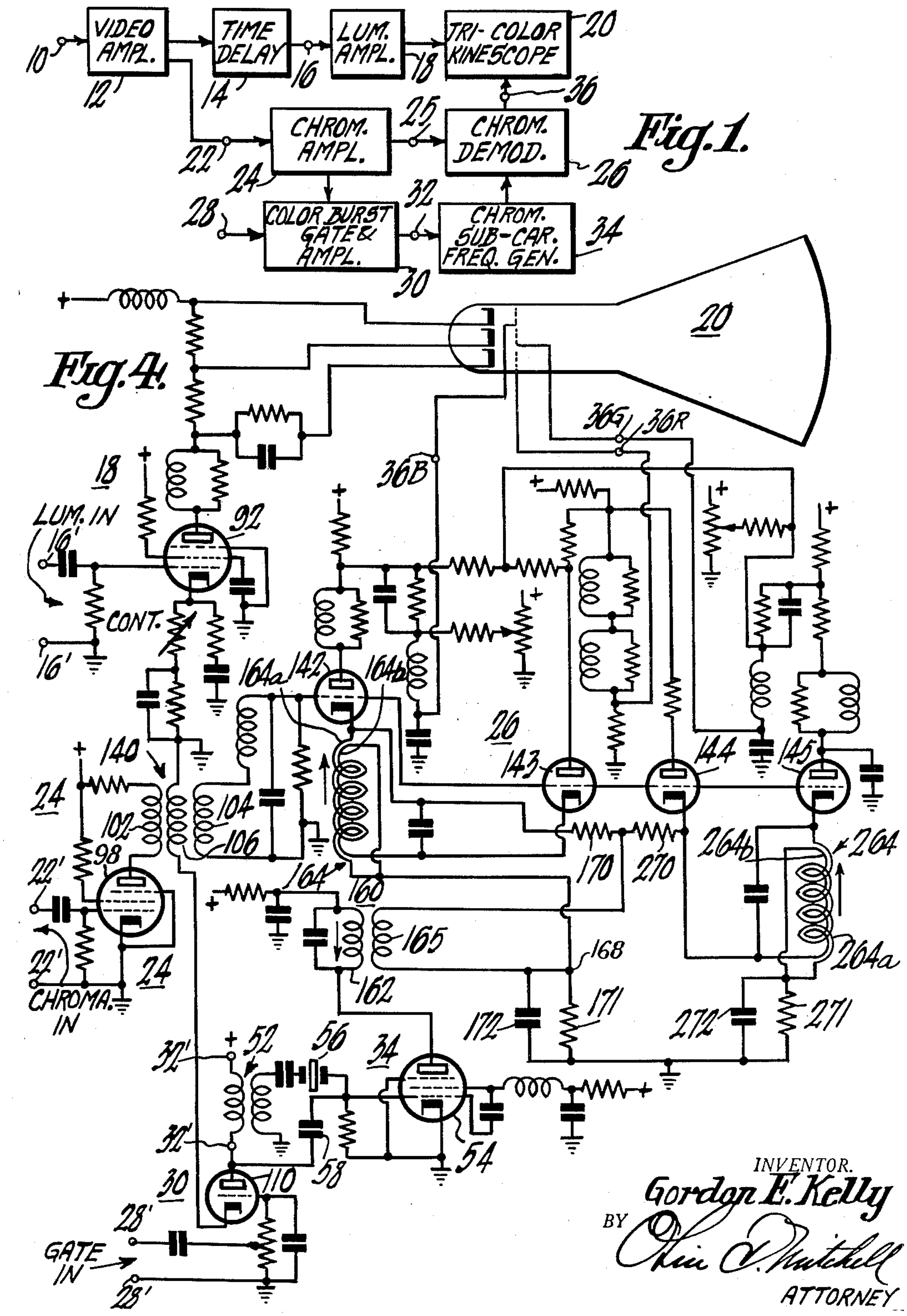
FIG. 1 is a functional diagram of portions of a color television receiver which may incorporate the invention.
FIG. 4 is a schematic diagram of another embodiment of the invention.

Referring first to FIG. 1, there is shown a functional diagram of portions of a color television receiver to which the invention is particularly applicable, and which receiver may otherwise comprise entirely conventional circuitry. In such a receiver, color television signals appearing at an antenna are amplified, heterodyned down to a lower intermediate frequency for additional amplification and demodulated. Frequency modulation sound signals are derived from the foregoing circuitry for further processing in an aural signal discriminating circuit, amplified and applied to a sound reproducer transducer, usually in the form of a speaker. The composite color signal is applied to a synchronized pulse separating circuit to separate the synchronizing pulses from the picture signals and to separate the horizontal synchronizing pulses from the vertical. The separated synchronizing pulses are applied to deflection wave generating circuitry to control the generation of deflection waves which are amplified and applied to the kinescope electron beam deflection system. High voltage circuitry and convergence voltage circuitry are coupled to the deflection generating circuitry to develop the necessary energizing potentials for the kinescope. A low voltage power supply, normally connected to the local A.-C. power line, is arranged to furnish direct energizing potential to all circuits. Automatic gain control and automatic frequency control circuitry may be incorporated to supply control potentials to the desired ones of the circuitry previously mentioned. Normally, the R.-F. and I.-F. amplifying circuits are at least supplied with automatic gain control potentials.

The demodulated composite color signal is applied to composite color input terminals 10 of a video frequency amplifying circuit 12. The composite color signal is applied by way of a delaying circuit 14 to the input terminals 16 of a luminance signal amplifying circuit 18 for presentation to the input circuit of a tri-color kinescope image reproducing device 20. The composite color signal is also applied at input terminals 22 of a bandpass chrominance signal amplifying circuit 24 and the chrominance signal appearing at chrominance signal terminals 25 is applied to a chrominance signal demodulating circuit 26. A gating signal obtained by means of circuitry (not shown) operating in response to the deflection synchronizing pulses is applied at gating signal input terminals 28 of a color burst gating and amplifying circuit 30 to which the composite color signal obtained from the chrominance signal amplifying circuit 24 is also applied. The gated color bust appearing at color burst terminals 32 is applied to a chrominance subcarrier frequency color reference signal generating circuit 34 from which color reference signals required for demodulating the chrominance signal are obtained and applied to the chrominance signal demodulating circuit 26. Color difference signals derived in the chrominance signal demodulating circuit 26 and appearing at output terminals 36 are applied to the tri-color kinescope for mixing with the luminance signal to reproduce the televised image in full color. Not only must the locally generated color reference signal be of the same frequency as the chrominance subcarrier, but the phase relationship must be properly established in order that the proper hue be reproduced by the image reproducing device. While the amplitude of the color reference signal may be made sufficiently large so that under ordinary circumstances variations in amplitude have little or no effect on the reproduced image, in some instances where the chrominance signal demodulating circuit requires a plurality of color reference signals, the amplitudes of the color reference signals must also be of approximately the same order of magnitude, otherwise the background illumination of the reproduced picture will vary in accordance with the amplitude difference and thereby distort the image reproduced both as to luminance and chrominance values.

Figures 2, 3:
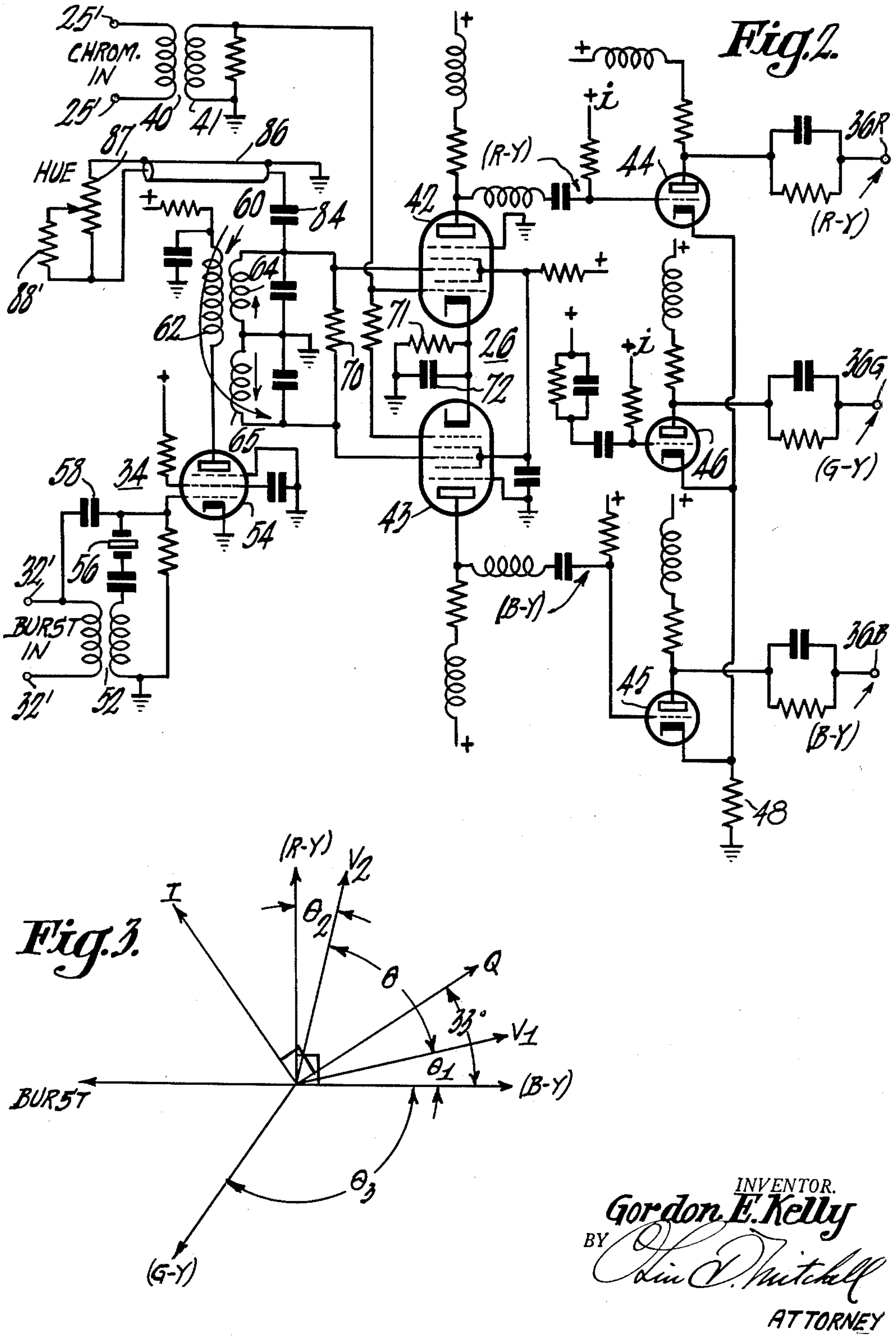
FIG. 2 is a schematic diagram depicting an embodiment of the invention for generating color reference signals of intercardinal angular phase relationship according to the invention for application to a chrominance signal demodulating circuit functioning as outlined in FIG. 1.
FIG. 3 is a vector diagram of signal relationships required for operation of chrominance signal demodulating circuitry and which are useful in an explanation of the invention.

An example of an application of the invention to color television receiver demodulating circuitry is shown in FIG. 2. The bandpass chrominance signal supplied to chrominance signals input terminals 25′ and translated by means of a transformer 40 to the grid-cathode circuits of a pair of demodulating electron discharge devices, shown in the form of pentigrid converter tubes 42, 43 of the chrominance signal demodulating circuit 26. In accordance with known practice color reference signals are applied to the injection grid-cathode circuits of the demodulating tubes 42, 43 to produce $(R-Y)$ and $(B-Y)$ signals at the anodes respectively. These color difference signals are then applied to a pair of electron discharge matrix tubes 44, 45, the cathode electrodes of which are connected to the cathode of another matrix tube 46; all sharing a common cathode resistance element 48. The three matrix tubes 44–45 are arranged to produce three color different signals $(R-Y)$, $(G-Y)$, and $(B-Y)$ at the output terminals 36R, 36G, and 36B respectively.

Color reference signals of proper phase for application to the injection grid-cathode circuits of the demodulating tubes 42, 43 are obtained from a color reference signal generating circuit 34 according to the invention. Gated color bursts obtained by conventional means are applied to burst input terminals 32′ and translated by means of a coupling transformer 52 to the grid-cathode circuit of an electron discharge oscillator device 54. A piezo-electric crystal device 56 is interposed in the grid circuit of the oscillating tube 54. The crystal device 56 is cut to series resonance at the chrominance subcarrier frequency, therefore providing locked-in oscillator action. A neutralizing capacitor 58 is connected between the control grid of the oscillating tube 54 and one terminal of the primary winding of the burst coupling transformer 52 in order to eliminate the appearance of burst side-band energy at the grid of the oscillator tube. A color reference signal is developed in phase with the received color burst across a primary winding 62 of a phase splitting transformer 60 according to the invention. The transformer 60 also comprises two secondary windings 64, 65 in which currents of the chrominance subcarrier frequency are induced by mutual coupling to the primary winding 62. One secondary winding 64 is connected between the cathode and the injection grid of the $(R-Y)$ demodulating tube 42 and the other secondary winding 65 is connected between the cathode and the injection grid of the $(B-Y)$ demodulating tube 43. The secondary windings 64, 65 are tuned by means of adjustable capacitance elements or adjustable cores or both to parallel resonance at the chrominance subcarrier frequency. The secondary windings 64, 65 are further tuned, with the resistance between the injection grids of the tubes 42, 43 infinite or very high, so that the potentials on the injection grids are in a predetermined phase relationship. Such tuning is simply described in the Radio Engineers Handbook, by F. E. Terman, first edition, published by McGraw-Hill, 1943, pages 135–145. The two windings may be tuned to provide a phase shift of 45° in opposite directions, for example, or one winding may be tuned to phase quadrature with respect to the other windings which is tuned to 0, or 180° or some other convenient cardinal angle. With a cardinal angle of 90°, the secondary winding 64 may be tuned to phase quadrature with the secondary winding 65 which is in phase with the color bursts by tuning for maximum output as indicated on a sensitive amplitude device, such as a vacuum tube voltmeter.

Such an arrangement is depicted pictorially in FIG. 3 which is a graphical representation of pertinent phase relationships. In accordance with existing Federal Communications Commission standards, the I and Q signals, which are established by definition in phase quadrature relationship, are generated at angles of 33.00° with respect to the $(R-Y)$ and the $(B-Y)$ color difference signals, the latter of which is established in the opposite direction to the color burst phase. Now there are a number of circuit arrangements known which effectively reproduce the desired color difference signals at other than the cardinal angles. According to fundamental principles of the established color television signalling system, the three necessary color difference signals may be derived from any two color difference signals provided the underlying relationships are clearly understood and accounted for. For example, there are a number of systems, including that shown in FIG. 2, operating on the determination of two vectors $V_1$, $V_2$ which are displaced from the phase quadrature color difference signals and $(B-Y)$ and $(R-Y)$ and which determine the third color difference signal $(G-Y)$ which remains in the same phase relationship with respect to the two vectors $V_1$, $V_2$ as for the color difference signal vectors $(B-Y)$ and $(R-Y)$. In the system illustrated in FIG. 2 and for a number of other systems, the phase angle $\theta$ between the two vectors $V_1$, $V_2$ has been determined to be of the order of 63.58° with $\theta_1$ being about 13.5° and $\theta_2$ about 12.9° respectively. The underlying principles and the derivations for these particular angles may be had for reference to the current literature; these factors not being considered here because the invention is concerned only with providing and maintaining the desired inter-cardinal phase relationship of the color reference signals.

Considering both FIGS. 2 and 3, it is assumed that secondary winding 64 is tuned to produce an alternating potential upon the injection grid of the demodulating tube 42 which is in phase with the alternating voltage across the primary winding 62. The other secondary winding 65 is then adjusted in the absence of the phasing resistance element 70 to produce a wave at the injection grid of the other demodulating tubes 43 which is in phase quadrature with the voltage applied to the injection grid of the one demodulating tube 42. In order to obtain the desired inter-cardinal phase displacement between the two voltages, a resistance element 70 is connected according to the invention between the injection grids and given a value at which the desired angle, for example 63.58°, is obtained. The action of the phasing resistance element 70 may be explained on the basis of vector analysis. As originally tuned and without the critical value of the resistance element 70, the two transformer windings 64, 65 produce potentials which are in phase quadrature with respect to each other. A vector diagram illustrating this condition would comprise two vectors extending at right angles to each other. If the magnitude of the vectors were equal then the resultant vector which may be obtained by adding the two voltages in a given circuit would be represented by a vector lying intermediate the other vectors at an angle of 45° and of magnitude equal to 1.41 times the amplitude of either vector. Again, if the quadrature vector were 1.734 times the amplitude of the reference vector, the resultant voltage vector would lie at an angle of 60° with respect to the reference vector and would have a magnitude of twice the amplitude of the reference vector. Also, it should be realized that the polarity or sign of one or both of the vectors may be reversed, if required, according to the known mathematical laws. This is accomplished in practice by reversing the connections to the terminals of one or both of the windings 64, 65 and so on as is well known. To obtain the desired resultant value of a vector for properly operating the demodulating circuit 26 as shown in FIG. 2, the voltage applied to the grid of the one demodulating tube 42 comprises a portion of the inphase or reference vector obtained from the winding 64 and a portion of the quadrature phase vector voltage obtained from the winding 65, the proportion being determined by the resistance value of the resistance element 70. In the example shown a value of 6800 ohms for the resistance element 70 provided the desired phase difference of 63.5°. The voltage applied between the cathode and the injection grid of the other demodulating tube 43 must necessarily be of the proper phase with respect to the reference and quadrature vectors due to the limitations imposed by the direct circuit connections. Thus in a two-tube chrominance signal demodulating circuit only two separate windings are required according to the invention to establish and maintain the proper phase relationship between the elements of the demodulating circuit. It should also be noted at this point that in so far as adjustment of the demodulating circuit 26 is concerned, the technician need only connect a sensitive amplitude measuring device between the two injection grids of the demodulator tubes 42, 43 and tuned for maximum deflection just as though establishing the cardinal angle phase relationship. It is also an advantage of this circuit arrangement that the ratio of amplitudes of the two voltages on the injection grids must remain constant, since any increase in one will be reflected as an increase in the other due to the presence of the phasing resistance element 70.

Further aspects of the invention are found in the application illustrated by the schematic diagram of FIG. 4. A luminance signal is applied at the input terminals 16′ to the grid of a luminance amplifying electron discharge device 92 having an output voltage dividing network designed to apportion the luminance signal as applied to the cathodes of the tri-color kinescope 20 in accordance with the established values for the compatible color television system. A chrominance signal which is obtained from the video amplifier is applied to chrominance input terminals 22′ connected to the input circuit of electron discharge device 98 having the primary winding 102 of a bandpass chrominance signal transformer 140 in the anode circuit. A secondary winding 104 is employed to apply chrominance signals between a point of reference potential, shown as ground, and all of the grids of the demodulating tubes 142—145, the anode electrodes of which are coupled to the grid electrodes of the tri-color kinescope 20 in known manner.

By means of a tertiary winding 106 the chrominance signal, which includes the color bursts, is applied to the cathode of a gating electron discharge device shown as a triode 110. Gating pulses obtained from the horizontal deflection wave generating circuitry (not shown) in known manner are applied to the gating input terminals 28′ coupled to the grid of the gating tube 110 so that only the color bursts appear across the primary winding of the burst takeoff transformer 52. The input circuit of the color reference signal generating circuit generator 34 is shown as being similar to that shown in FIG. 2, although any known form of such circuit may be employed if desired. The transformer 160 in the output circuit of the oscillator tube 54 as shown in FIG. 4 comprises a primary winding 162, one secondary winding 164 comprising two bifilar wound conductors 164A, and 164B, and another secondary winding 165 all mutually coupled. In this type of demodulator each pair of demodulating tubes requires paraphase excitation, that is opposite phases of the same color reference voltage are applied to opposing tubes of the pair. This is accomplished according to the invention by the use of bifilar windings. Electrically opposing terminals of the bifilar winding conductors are connected in common to one terminal 168 of the other secondary winding 165. The other terminals of the bifilar wound conductors 164A and 164B are connected to the cathodes of the demodulating tubes 142 and 143 respectively so that the cathodes of these tubes swing simultaneously and symmetrically about the reference potential, shown as ground, which is established by means of biasing network comprising a resistor 171 and a shunt capacitor 172 offering low impedance to the color reference signal. Assuming the primary winding 162 to be in phase with the color burst, secondary winding 164 is adjusted to provide potential thereacross which is in phase quadrature with the voltage across the other secondary winding 165 in the absence of the resistance element 170. This adjustment is made in accordance with known practice, such as described in the above mentioned reference to the Radio Engineers Handbook. By means of the series connected resistance element 170 the phase of the voltage applied to the cathode of the demodulating tube 142 is brought to the required angle for the type of demodulating arrangement shown as described above in connection with the arrangement of FIG. 2. Further, according to the invention the phase relationship of the voltage applied to the cathode of the other demodulating tube 143 is brought to precisely the same angle because the reference potential component is induced in the other bifilar wound conductor 164B through the intermediary of the first conductor 164A. It should be understood that bifilar windings are not essential to the practice of the invention but afford at least two distinct advantages in this circuit. The first advantage is that it is easier to wind the bifilar winding to obtain the same output voltage from each conductor within a given tolerance. A more important reason is that it is easier to couple the in phase component according to the invention since the transformer action eliminates the need for an additional phasing resistance element and for a means to insure that the added phasing resistance element changes the phase to exactly the same degree as the one element shown.

Another bifilar winding 264 is used to apply potentials in phase opposition to the cathodes of the remaining demodulating tubes 144, 145. The winding 264 is tuned to resonance at the chrominance subcarrier frequency and energy in phase with the color burst is applied by means of a series resistor 270 from the secondary winding 165 of the transformer 160. The series resistor 270 is given a value at which the amplitude of the in phase component be made substantially constant despite normal fluctuations of the power line, subcarrier output voltage and so forth. It should be understood that if desired one bifilar winding 164 might be tuned to 45° from the reference phase and the other bifilar winding 264 tuned to 45° in the opposite direction, in which case the series resistance element 270 would be chosen to provide the desired phase shift away from the cardinal angle and both of the resistance elements 170 and 270 would serve as amplitude stabilizing elements as well as phase modifying and stabilizing elements. It should also be noted that the values of the resistance elements 170 and 270 are such that the two pairs of demodulating tubes are effectively decoupled one from the other over the entire range of operation of the chrominance signal demodulating circuit 26.

The basic chrominance signal demodulating circuits of the type shown in FIG. 4 depends on push-pull color reference signal drive that is relatively harmonic free. By tuning the bifilar winding to the chrominance subcarrier for color reference signal frequency, the circuit is resistive for in phase operation and the impedance characteristic is symmetrical about the subcarrier frequency. In addition to symmetrical impedance characteristic, the single tuned bifilar winding 264 has the effect of high frequency peaking. In the conventional coupled circuit drive with one circuit tuned with maximum output in phase quadrature with another secondary also tuned for maximum output, a double humped impedance characteristic is obtained. By the use of the circuit according to the invention a single humped response curve obtained at the desired inter-cardinal angle. This is advantageous also in adjusting the circuit since the technician need tune only for maximum response at the subcarrier freqeuncy.

It should be understood that the color reference signal generating circuit according to the invention is not limited to the circuits shown, but is applicable to any circuit arrangement in which a plurality of continuous electrical waves are desired at inter-cardinal phase relationships. An example of another color television demodulating circuit to which the invention is applicable, is the grounded green grid circuit in which three demodulating tubes are employed. The grid circuit of one of the tubes in this demodulator circuit is grounded. Usually the green color difference signal is grounded, hence the term, and the other grids are excited by the color reference signal of predetermined inter-cardinal phase relationship.

The circuit arrangements according to the invention do not preclude the use of auxiliary phase shifting devices for hue control. Hue control may be readily effected by varying the capacitance across one of the windings of the color reference signal generating transformer.

For example, the capacitance across the primary winding of the transformer winding 62 is varied in the arrangement shown in FIG. 2. A capacitive voltage dividing arrangement is shunted across the primary winding. This voltage dividing arrangement comprises a capacitor 84 connected in series with another capacitor and/or the capacitance component of a length of shielded cable 86. Variation in the capacitive reactance is afforded by means of a potentiometer 87 and a fixed resistor 88. With the arrangement shown a phase shift of plus or minus 40° is obtainable and the potentiometer 87 may be located at any convenient part of the television receiver without difficulty. It is only necessary that the total capacitance of the shielded cable 86 be substantially fixed for any given design.

While those skilled in the art will determine the values of components to be used in a particular application of the invention, the pertinent values parts listed below are suggested as a guide to the practice of the invention.

| Ref. No. | Component | Type or Value |
|---|---|---|
| 42, 43 | Chrominance Demodulator tubes | 6BY6. |
| 44, 45, 46 | Matrix tubes | 1/s. 12BH7A. |
| 48 | Common cathode resistor | 560 ohms. |
| 54 | Color reference oscillator tube | 6CB6. |
| 70 | Series phasing resistor | 6,800 ohms. |
| 71 | Bias resistor | 270 ohms. |
| 72 | Bypass capacitor | 1,000 mmf. |
| 84 | Series capacitor | 120 mmf. |
| 84′ | do | 270 mmf. |
| 85 | Shunt capacitor | 100 mmf. |
| 86 | Shielded cable | Type. |
| 87 | Hue control potentiometer | 500 ohms. |
| 88 | Series resistor | 1 kilohm. |
| 89 | do | 470 ohms. |
| 92 | Luminance amplifier tube | p./s. 6AW8. |
| 98 | Chrominance amplifier tube | p./s. 6AW8. |
| 110 | Burst gating tube | t./s. 6AN8. |
| 142–145 | Demodulator tubes | 1/s. 12AT7. |
| 170 | Phasing resistor | 4,700 ohms. |
| 171 | Bias resistor | 1,500 ohms. |
| 172 | Bypass capacitor | 10 mf. |
| 270 | Amplitude regulating resistor | 1,500 ohms. |
| 271 | Bias resistor | 1,000 ohms. |
| 272 | Bypass capacitor | 10 mf. |

The invention claimed is:

1. In a color television receiver, a transformer having a primary winding and a pair of secondary windings, means for developing reference oscillations of burst frequency in said primary winding thereby to induce oscillations in said secondary windings, means tuning said secondary windings to produce output voltages thereacross of said burst frequency which normally differ in phase by an odd multiple, including unity, of ninety degrees, a color demodulator device individual to each of said secondary windings, and means including a resistive element intercoupling said secondary windings to adjust the phase difference to an angle different from an odd multiple of 90 degrees.

2. Electric wave generating apparatus including, a transformer having a primary winding and a pair of secondary windings, means for developing a wave energy of given frequency in said primary winding thereby to induce wave energy in said secondary windings, a utilization device individual to each of said secondary windings, and means including a resistive element intercoupling said secondary windings to adjust the phase difference between the voltages appearing across said secondary windings at said given frequency to an intercardinal angle and to equalize the amplitudes of said output voltages, said resistive element having a value at which said utilization devices are substantially decoupled, said secondary windings being tuned to cause voltages appearing therecross at said given frequency to differ in phase by a cardinal angle in the absence of said last-named means.

3. In a color television receiver, a transformer having a primary winding, and a pair of secondary windings, one of said secondary windings comprising two bifilar wound conductors, means for developing color reference oscillations of burst frequency in said primary winding thereby to induce oscillations in said secondary windings, means tuning said secondary windings to produce output voltages thereacross of said burst frequency which normally differ in phase by a predetermined cardinal angle, a color demodulating device individual to each of said conductors of said bifilar winding, and means including a resistance element connecting the other secondary winding of said transformer across one of said bifilar windings to adjust the phase difference between the voltages across each conductor of said bifilar winding and said other winding to a predetemined inter-cardinal angle.

4. Electric wave generating apparatus including, a transformer having a primary winding, and a pair of secondary windings, one of said secondary windings comprising two bilfilar wound conductors, means for developing wave energy of given frequency in said primary winding thereby to induce wave energy in said secondary windings, a further winding comprising two bifilar wound conductors, means tuning said further winding to resonance at said given frequency, a plurality of utilization devices, means for coupling each of the conductors of said one secondary winding and each of the conductors of said further winding to a respectively different one of said plurality of utilization devices, and means including a resistance element coupling the other secondary winding of said transformer across said bifilar windings to establish the phase difference between the voltage across the conductors of said bifilar secondary winding and the voltage across the conductors of said further bifilar winding at a predetermined intercardinal angle, said secondary windings being tuned to produce voltages thereacross at said given frequency which differ in phase by a predetermined cardinal angle in the absence of said last-named means.

5. A color television receiver comprising, a color reference signal generating apparatus including a transformer having a primary winding, and a plurality of secondary windings, one of said secondary windings comprising two bifilar wound conductors, means for developing wave energy of color burst frequency in said primary winding thereby to induce wave energy in said secondary windings, means tuning said secondary windings to produce voltages thereacross of said color burst frequency and differing in phase by a predetermined quarter cycle, a further winding comprising two bifilar wound conductors, means tuning said further winding to resonance at said color burst frequency, a chrominance signal demodulating circuit including a plurality of electron discharge devices each having cathode, grid electrodes and an anode, means to apply a chrominance signal to the like electrodes of all of said electron discharge devices and means connecting another electrode of an electron discharge device individual to each of said conductors of said bifilar windings, a resistance element, means connecting said resistance element and the other secondary winding of said transformer in series across one of the conductors of said bifilar secondary winding to adjust the phase difference between the two windings to a predetermined angle, another resistance element, and means connecting said other resistance element and said other secondary winding in series across said further bifilar winding to equalize the output voltages across said bifilar windings, said resistance elements having values at which said bifilar windings are substantially isolated from each other.

6. In a color television receiver, the combination of, a source of color reference oscillations having an output primary coil, two color demodulator devices each having input terminals, demodulator input coils coupled to said input terminals, means coupling said oscillator primary coil to said demodulator input coils, capacitors connected across said coils to tune the coils to resonance at the frequency of said reference oscillations, and resistor means connected between said demodulator coils, said resistor means being proportioned so that when said coils are tuned to provide maximum response at said reference frequency the phases of the oscillations in the two demodulator coils are in a predetermined intercardinal relationship.

7. Electric wave processing apparatus including the combination of a pair of windings coupled to a common source of wave energy of a given frequency; a first means for utilizing said wave energy having an input terminal coupled to one of said pair of windings; a second means for utilizing said wave energy having an input terminal coupled to the other of said pair of windings, said first and second wave utilization means requiring the delivery of wave energy of said given frequency to the respective input terminals with a phase difference therebetween corresponding to a predetermined intercardinal angle; means for tuning at least one of said windings such that, in the absence of wave energy intercoupling between said input terminals, wave energy of said given frequency is delivered to the respective input terminals with a phase difference therebetween corresponding to a cardinal angle; and means separate from said utilization means and including a resistive element providing a direct current connection between said input terminals for altering the phase difference between the wave energy delivered to the respective input terminals from a phase difference corresponding to a cardinal angle to a phase difference substantially corresponding to said predetermined intercardinal angle.

8. In a color television receiver including a source of modulated color subcarrier waves and a source of local oscillations of color subcarrier frequency, the combination comprising a transformer coupled to said local oscillation source and including a pair of windings having separate output terminals for supplying oscillations of said subcarrier frequency to separate utilization means, a first color demodulator responding to modulated color subcarrier waves from said first named source and having a local oscillation input terminal coupled to the output terminal of one of said pair of windings, a second color demodulator also responding to modulated color subcarrier waves from said first named source and having a local oscillation input terminal coupled to the output terminal of the other of said pair of windings, tuning means associated with at least one of said windings for causing a phase difference to exist between the local oscillations from said second named source appearing at the local oscillation input terminal of said first color demodulator and the local oscillations from said second named source appearing at the local oscillation input terminal of said second color demodulator which corresponds to a cardinal angle, and means including a resistive element interconnecting the local oscillation input terminal of said first color demodulator and the local oscillation input terminal of said second color demodulator for altering said phase difference to correspond to a predetermined intercardinal angle and for equalizing the amplitude of the local oscillations appearing at the respective input terminals.

References Cited in the file of this patent

UNITED STATES PATENTS

| | | |
|---|---|---|
| 2,341,047 | Koch | Feb. 8, 1944 |
| 2,413,913 | Duke | Jan. 7, 1947 |
| 2,743,310 | Schroeder | Apr. 24, 1956 |

FOREIGN PATENTS

| | | |
|---|---|---|
| 951,255 | France | Oct. 20, 1949 |

OTHER REFERENCES

RCA, Model CT-100, March 31, 1954, pages 31 to 34.